United States Patent [19]

Fast

[11] Patent Number: 4,899,648

[45] Date of Patent: Feb. 13, 1990

[54] CONTINUOUS PROCESS APPARATUS FOR COOKING CEREAL GRAINS

[75] Inventor: Robert B. Fast, Ridgewood, N.J.

[73] Assignee: Nabisco Brands, Inc., East Hanover, N.J.

[21] Appl. No.: 43,466

[22] Filed: Apr. 28, 1987

Related U.S. Application Data

[62] Division of Ser. No. 671,970, Nov. 16, 1984, Pat. No. 4,699,797.

[51] Int. Cl.$^4$ ............................................. A47J 37/12
[52] U.S. Cl. ...................................... 99/407; 99/403; 99/408; 99/471
[58] Field of Search ................. 99/471, 536, 403, 404, 99/407, 408; 426/455, 462, 508, 523

[56] References Cited

U.S. PATENT DOCUMENTS

| | | | |
|---|---|---|---|
| 129,906 | 7/1872 | Sackett | 99/469 |
| 911,408 | 2/1909 | Jensen | 99/447 |
| 1,067,342 | 7/1913 | Reynolds | 426/256 |
| 2,638,838 | 5/1953 | Talmey et al. | 99/237 |
| 2,884,327 | 4/1959 | Robbins | 99/80 |
| 3,132,948 | 5/1964 | Smith et al. | 99/80 |
| 3,684,526 | 8/1972 | Lowery | 99/93 |
| 3,778,521 | 12/1973 | Fisher et al. | 99/80 PS |
| 3,914,449 | 10/1975 | McPhail | 426/461 |
| 3,944,678 | 3/1976 | Pratolongo | 426/508 |

*Primary Examiner*—Linda J. Sholl
*Attorney, Agent, or Firm*—Richard Kornutik

[57] ABSTRACT

A vertical cooker vessel is used for cooking a grain product. The cooker is vertically oriented and has a conical baffle so as to ensure plug flow so that grain is neither undercooked nor overcooked. The cooking water fills the vessel and maintained at a predetermined elevated temperature while a continuous stream of water is drawn off through a sieve in the bottom portion of the cooker, then recirculating the water, mixing with raw grain, and then heating, where steam is added to reheat the water and grain. The mixture is added to the top of the vessel. Cooked grain exits from the bottom of the cooker under control of a metering pump. Grain is separated from the water, with water from the separator returning to a mixer for mixing with the recycled water. A conical baffle is located near the sieve. This ensures plug flow of grain through the cooker. A lower second conical baffle prevents turbulent flow beneath the first conical baffle, which flow would otherwise disrupt plug flow.

7 Claims, 2 Drawing Sheets

CONTINUOUS PROCESS APPARATUS FOR COOKING CEREAL GRAINS

This is a division of application Ser. No. 671,970, filed on Nov. 16, 1984, now U.S. Pat. No. 4,699,797.

BACKGROUND OF THE INVENTION

This invention relates to an apparatus and method for cooking cereal grains and particularly to the use of a recycling step as well as use of a vertical cooker for continuously, evenly cooking a grain product while maintaining plug flow.

It is well known in the cooking art to employ vertical cylindrical continuous cookers. A problem the prior art attempts to solve is even cooking of material added to cookers. Cookers of this type have a conical baffle disposed near the bottommost portion of the vertical cooker. In these prior art devices, grain is added to the top of the vertical cooker, which is circular in cross section, and removed from the bottom of the vertical cooker. The temperature of the water in a typical vertical cooker is maintained by a controller, and by use of direct steam injection or use of a steam jacket about the cooker, and the level of water in the cooker is also ordinarily controlled. In particular, it is known to use a vertical continuous cooker having a cone disposed near a bottom portion thereof.

There are several teachings in the prior art of continuous process methods using vertical cookers as a part thereof. In one of these references, U.S. Pat. No. 2,638,838 issued to Talmey et al., an apparatus is shown for heating granular material in a continuous process.

Talmey teaches a method of treating granular material, in a pressurized vessel, including grain, including steps of soaking, de-watering, cooking, again de-watering, dehydrating, and cooling. A float controlled valve is used to maintain constant head of water in tanks. Heated water of 200° F. is used in a mixer. Water is added along the sides of the tanks during cooking. Water separation occurs in the casing of the conveyor, not in the cooker, by way of a perforated section that is surrounded by an auxiliary jacket. The pressure cooker is vertical and has a baffle. Steam jets are supplied to the material as it gravitates downwardly in the cooker. The steam condenses and collects in the bottom of the cooker, the bottom having perforated openings so as to allow water to be drawn off by a pipe to a pump. This vessel is not, however, full of water, but rather steam which condenses and collects at the bottom. Furthermore, since direct steam injection is used, plug flow would be disrupted in this type of device. The water so collected is reinjected into the top of the cooker by a spray nozzle. However, there is no teaching or suggestion of injecting steam into the return water, nor of separating condensed water from the granular material within the vertical cooker, nor of maintaining plug flow within the vertical cooker. Furthermore, although additional treatment steps are shown, none relates to separating the final product and returning that condensate to the vertical cooker to aid cooking and ensure plug flow of the mixture of water and granular material through the vertical cooker. Such plug flow, if relatively uniform, would ensure even cooking of all grains in the cooker.

Another patent, U.S. Pat. No. 3,778,521 to Fisher et al., shows a process for the continuous production of bulgur.

The Fisher et al. patent shows the mixers having conical baffles therein used for the heating and mixing of wheat with water. A variety of control elements and use of steam are shown. However, steam injection appears to occur primarily in horizontal conveyor passage ways, and not in the vertical mixing devices. This differs significantly from the present invention, which doesn't use steam injection within the vertical cooker at all. Such steam injection would also disrupt plug flow if used in a vertical cooker. Moreover, the use of a separator to return liquid to a vertical cooker is not shown or suggested in Fisher nor is true plug flow taught therein.

Another type of continuous process is taught in U.S. Pat. No. 3,132,948 to Smith et al., which teaches a process of producing bulgur. A multi-stage process is shown, including moistening wheat with excess water, tempering, cooking, and drying the product. U.S. Pat. 2,884,327, to Robbins, shows a method of processing wheat. The wheat is subjected to heat and moisture while moving the wheat. These patents fail to teach plug flow using a vertical cooker as part of a process of cooking.

Other patents, while not appearing to be as relevant as the foregoing, are also of interest.

The U.S. Pat. Nos. 911,408, 1,067,342, 129,906, 3,684,526, and 3,944,678, all relate to the controlling of moisture in flour or wheat products. Each of these references relate to a vertical chamber in which a product is received and from which the product exits. The most relevant of these references is to Lowery, U.S. Pat. No. 3,684,526, showing a pipe 36 for injecting a spray mist, not disclosed to be steam, at point 39 so as to slightly moisten the flour to a moisture level of 1.9%. However, there is no suggestion in any of these patents of using water and granular material in pre-mixed form for introduction into a vertical cooker to avoid uneven cooking and to ensure plug flow.

SUMMARY OF THE INVENTION

It is accordingly one object of the present invention to provide a continuous process apparatus and method for uniformly cooking cereal grains, including a vertical cooker for cooking grain, a method of recirculating and reheating the cooking water, and a separator for separating the grain from cooking water, including recycling of the cooking water so separated to the mixture of grain and water entering the vertical cooker.

A further object is to cook grain evenly and uniformly in plug flow in a vertical continuous cooker.

Another object of the present invention is to provide a continuous process apparatus and method for cooking cereal grains including a vertical cooker receiving a pre-heated mixture of granular material and water, for continuous cooking in true plug flow to ensure even, uniform cooking; granular material such as wheat or the like being fed into the cooker by a continuous feeder, a separator including a sieve which receives recycled water combined with the water being separated and exiting from the vertical cooker, with a wheat and water mixture being separated at a sieve portion, water from the sieve being recycled to be mixed with the wheat input to the vertical cooker.

It is another object of the present invention to provide an improved continuous process apparatus and method for cooking cereal grains, including a separator, a vertical cooker having a conical baffle to ensure plug flow, steam injection for heating the water, a water level controller, wheat level controller, and temperature controller for the vertical cooker, a metering pump to control the flow of grain exiting from the vertical cooker, recycling separated water from the vertical cooker by a sieve in the vertical cooker, the sieve being for separating the wheat and water.

The improved continuous process apparatus and method for cooking cereal grains is used as follows.

The invention is a continuous process method for cooking cereal grains. A vertical cooker is used for cooking a grain product. The cooker is filled with hot cooking water maintained at the desired cooking temperature and at a desired level within the cooker. The cooker is vertically oriented and has a conical baffle so as to ensure plug flow so that grain is neither undercooked nor overcooked. The cone angle used can be varied for different materials, as a result of routine experimentation if so desired. In the instant invention, the cooking water is maintained at a predetermined elevated temperature while drawing off a continuous stream of water through a sieve located near the lower portion of the conical baffle. The temperature of the water and wheat mixture added to the vertical cooker is maintained by a temperature controller, and the level of water in the cooker is maintained by a level controller. A vibratory mechanism is used to ensure smooth plug flow of grain from the cooker, by vibrating the sieve and baffle members. Cooked grain exits from the bottom of the cooker under the action of a metering pump. The mixture of grain and water flows to a separator outside the vertical cooker. Grain is separated from the water by the separator, with water from the separator selectively returning to the cooker for recycling as needed.

Water is recycled from the cooker to be mixed with the grain entering the vertical cooker, thereby causing convection heat transfer from the water to the grain due to the higher velocity of water relative to the grain, which is retained and metered in flow by the metering pump. This ensures plug flow in the cooker since no liquid injection disturbs flow in the cookers; also, since no steam jacket is used, an even, generally uniform, heating of the grain is possible since the hot water is pre-mixed with the grain before entering the cooker, and the conical barrier and the sieve permit controlled plug flow through the vertical cooker to ensure even cooking.

Further details and advantages of the present invention appear from the following description of a preferred embodiment shown schematically in the drawings.

DETAILED DESCRIPTION OF THE INVENTION

Figure 1:
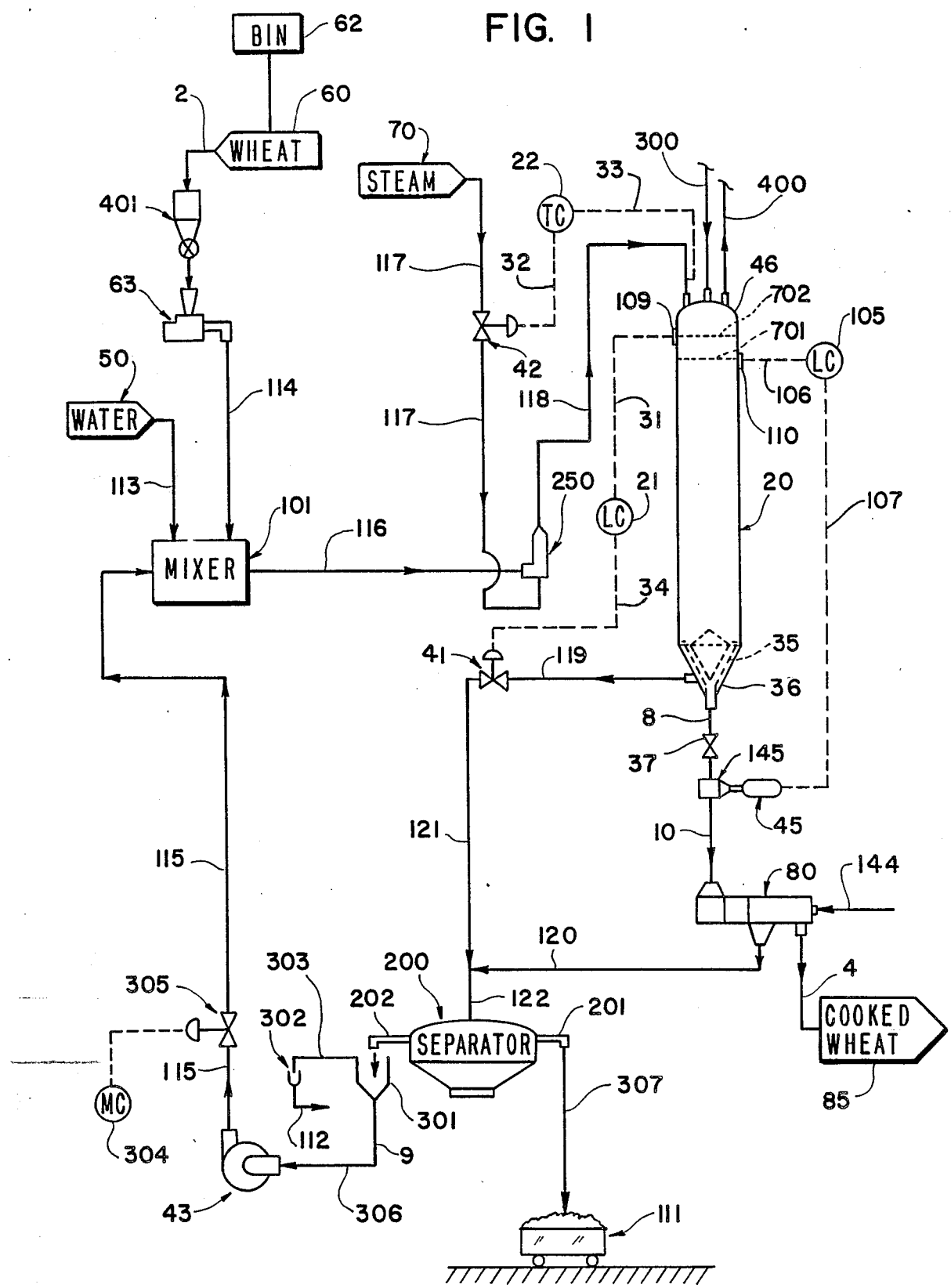
FIG. 1 is a schematic view of a process according to the present invention.

FIG. 1 shows a schematic diagram of the continuous process of the present invention. A raw grain supply bin 62 supplies raw grain to supply 60 which supplies grain at a temperature range of approximately 50° F. to 110° F., or any ambient temperature, by a raw wheat supply conduit 2 to a wheat use bin 401. The raw wheat supply coming from storage can of course be at an ambient temperature lower or higher than the usual range given, depending on local conditions and storage methods.

The wheat use bin 401 supplies grain to a continuous feeder 63, which supplies grain on a weighed basis as indicated at 114 to a mixer 101.

The mixer 101 receives a steady stream of recirculating water from conduit 115, and also can receive make-up water from a fresh water supply 50 by a conduit 113. The mixer assures wetting and moistening of the individual grains of the granular material received from the continuous feeder, by the recirculating water and by the fresh make-up water. Any conventional mixing device can be used, for example, a tank having a motorized stirrer; any commercial mixer; a ribbon blender; a screw conveyor; continuous paddle mixer; or the like. The grain and water mixture, referred to hereinafter as a slurry, exits the mixer by a conduit 116 at approximately 200° F., depending upon the initial temperature of the water and wheat entering the mixer 101.

The conduit 116 supplies the slurry to a heater 250. The heater 250 can be any type of heater, for example, a steam injection heater, a coiled-tube heater having a segregated heating fluid within the coils, any convection heater having a heating means associated therewith, or any other heater suitable for heating the slurry. The slurry is heated, in a preferred embodiment, to 210° F. by steam injection. Any other heating means may obviously be used instead of steam injection.

In the preferred embodiment, steam is supplied from a steam supply 70 at any pressure, from any source, in this case for example, at approximately 25 psig through a conduit 117 to the steam injection heater 250. There, the slurry and steam are mixed to heat the slurry to approximately 210° F. A steam injection control valve 42 controls the amount of steam injected to the heater 250, preferably by a temperature sensor communication line 33 which senses slurry temperature in the conduit 118. A temperature controller 22 receives the temperature information from the temperature sensor communication line 33, and the temperature controller 22 sends a control signal, by a steam valve controller communication line 32, to the steam control valve 42. This permits maintaining of any predetermined slurry temperature, in this case of approximately 210° F. Of course, any temperature appropriate to the particulate material (and process) could be maintained where particulate material other than grain is being cooked or otherwise processed.

The conduit 118 carries the heated slurry from the heater 250 to the top 46 of the vertical cooker 20. The slurry falls to a grain level 701 below the water level surface 702, the grain level being controllable as desired. The liquid water level 702 is preferably maintained at a predetermined elevation above that of the grain level 701, although for other processes the liquid level can be maintained below the particulate level if such is desirable. This permits even distribution of the grain across the top of the cooker 20 to ensure plug flow.

Plug flow is defined as the first grain in to the top of the cooker 20 is the first grain out, which ensures even cooking of all individual grains. This permits careful control of cooking time since overcooking of some grains is not required to ensure that all grains are properly cooked. Also, due to the controllable mass flow rate of recirculating water, discussed further hereunder, together with the separation and removal of the water by a sieve member 35 at the bottom of the cooker 20, the recirculating water can be controlled to flow with a relative downward speed or relative upward speed to the individual particulate grains. This would tend to increase the rate of heat transfer to individual grains by the water, since heat transfer is higher from a fluid to a solid when there is a relative velocity between them. This would tend to reduce the cooking time required, and would not disturb plug flow, as discussed further hereunder.

A fill pipe 300 enters the top 46 of the cooker 20, and can be used to initially fill the system with water. The system can be cold-started in this manner without grain, so as to preheat the water to desired levels. A vent line 400 is provided at the top 46 of the cooker 20, to allow escape of vapor, air, or water if pressure builds up in the cooker 20. The cooker 20 in a preferred embodiment can operate at atmospheric pressure; however, the cooker 20 can be adapted, if desired, to be a pressure cooker, and the associated equipment would then be adapted for pressure operation also. For example, pressure could be built up by choice of an appropriate mixer 101 to pressurize the slurry in the line 116. A pressure relief valve could then be used atop the cooker 20 instead of the vent line 400, to permit a predetermined pressure level to be maintained in the cooker 20. The metering pump 145, together with valve 41, could be used to maintain system pressure. Then, the remaining components may optionally be adapted for high pressure use if desired, although from the preceding discussion it is readily apparent that no other additional pressurized equipment would be necessary. Atmospheric operation is an advantage over pressure cookers, since less structural cooker 20 material thickness and conduit thickness would be required for atmospheric operation. The vent line 400 for atmospheric operation can be an open conduit pipe, or any other type of vent means. The fill conduit 300 for atmospheric operation can be any conventional pipe or conduit means.

A water level sensor 109 is attached to the cooker 20 in the vicinity of the desired water level 702. A wheat level sensor 110 is attached to the cooker 20 in the vicinity of the desired wheat level 701. These sensors can be optically actuated with electronic light detecting means to determine the presence of water or wheat, or they may be mechanical pivoting arm float devices; or may be any other known level sensing devices such as acoustic sensors which can send an output signal to a level controller, known in the art. Such level control is not crucial to the present invention, however, and may be done manually if desired using human operators watching a sight glass, for example, and operating appropriate control valves or motor controllers. The use of controllers in the present invention is described more fully hereunder.

Figure 2:
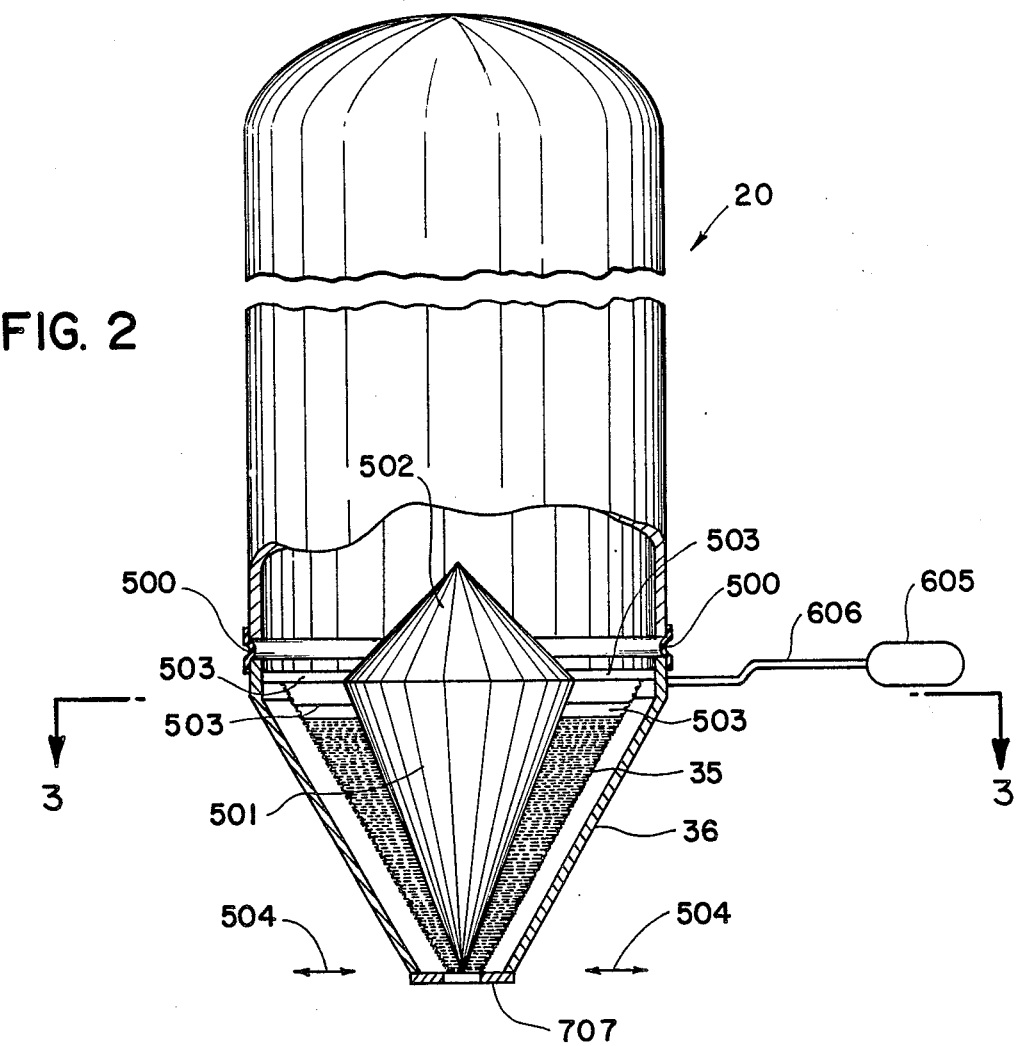
FIG. 2 is an elevational view of the vertical cooker partly broken away to show the conical baffle and sieve members of the vertical cooker.

The vertical cooker 20 is shown in greater detail in FIG. 2. The cooker 20 has an upper cone baffle 502 connected to a lower cone baffle 501. The upper cone baffle 502 prevents "funneling" of grain through the central portion of the cooker 20, which funneling would prevent plug flow. A particular cone angle is successful for this purpose, which in the preferred embodiment is 45 degrees as measured at the cone apex.

The cone angle, however, may be any appropriate angle that results in generally plug flow of the specific particulate material used. The optimum cone angle, for plug flow, is believed to depend upon the specific particulate material properties involved, such as grain size, adhesion properties, the fluid property behavior of the fluid used (in the present preferred embodiment, water), and so on. Thus, the optimum cone angle can be determined experimentally if necessary for a particular particulate material chosen and for particular operating conditions. Furthermore, although a cone is used in the preferred embodiment, other shapes can be used based, for example, upon complex curved shapes (such as a parabolic, hyperbolic, or dish shapes) determinable mathematically for a given set of particulate material and fluid parameters. The only criterion required is that the resulting baffle (here, cone 502) cause generally plug flow of grain through the vertical cooker.

The lower baffle 501 prevents eddy current flow in what would otherwise be a "dead zone" which would otherwise exist beneath the upper baffle 502. This therefore further ensures plug flow, since no grains can be swirled, mixed, or trapped by eddy current flow in such a "dead zone".

A flexible expansion joint 500 connects the vertical cooker 20 to the bottom 36, as seen in FIGS. 1 and 2. In FIG. 2, showing the cooker 20 and the bottom portion 36 cut away to reveal the interior details of the cooker, the sieve member 35 is seen as running parallel to the bottom 36. Sieve member 35 can thus be genrally uniformly spaced a predetermined distance from an interior wall of bottom 36. A valve 37 is preferably provided to control or shut off flow through conduit 8. The sieve member 35 is formed of a sieve material structure to permit passage of water therethrough but not of the entrained grain such as wheat. A sieve material structure could include, for example, a plate having holes therein, the holes being sufficiently small to prevent passage of individual particles of the particulate material. In the preferred embodiment, the holes would be smaller than the wheat grains. Other materials usable include a mesh screen, a corrugated sheet having slots therein, or any other material which can serve to permit passage of fluid but not individual particles of the particulate material (here, in the preferred embodiment, wheat grains are the particulate material). It is noted from FIGS. 1 and 2 that, while the sieve member is generally conically shaped so as to be more or less generally parallel to the lower cone portion 501, any shape generally having a uniform spacing (or a gradually tapering spacing) from the member 501 can be used, since this tends to maintain plug flow. This is so since portion 501 is not limited to a cone shape, but can have other shapes as well, including complex curved or angled surfaces, so long as plug flow is substantially maintained. Such modifications are contemplated as being within the scope of the present invention.

As seen in FIG. 2, a solid member 707 acts as a connector for members 36 and 35, and prevents leakage of water downward. This therefore prevents re-mixing of water (previously separated from the particulate material by the sieve 35) with the material flowing into conduit 8. The member 707 would appear generally disc-shaped if seen from the bottom of FIG. 2.

A vibratory unbalanced motor 605, being connected by at least one strut 606 to the bottom portion 36 preferably continuously vibrates the bottom portion 36, including the bottom 36 and sieve 35, to facilitate the flow of grain across the sieve 35 without disrupting plug flow as would occur if no vibratory effects were present. The vibratory action is not transmitted directly to, or absorbed by, the vertical cooker 20, due to the presence of an expansion joint 500, which is resiliently flexible, disposed circumferentially about the vertical cooker 20 where it joins the bottom 36 and sieve 35.

Struts 503 connect the upper baffle member 502 and lower baffle member 501 in spaced relationship to the sieve 35. The vibratory motion imparted to the lower portion, including the conical baffle members 501 and 502, is indicated as being generally horizontal by the arrows 504 in FIG. 2. However, such vibratory motion is not necessary to the present invention, and substantially plug flow (once started) would exist in the cooker even in the absence of such vibratory motion.

Thus, as can be seen from the figures, plug flow is maintained by the presence of the preferred conical baffle members 501 and 502, together with the sieve member 35 and the vibratory action of the motor 605 connected to the bottom portion 36. Wheat exits from the bottom-most portion of the bottom member 36. At the very bottom of the bottom member 36 in FIG. 2, a solid barrier 707 exists connecting the bottom-most edges of the bottom member 36 to the bottom-most edges of the sieve 35 to prevent flow of water downward with the flow of the remaining wheat-water mixture. Referring back to FIG. 1, the flow of the wheat-water mixture, flowing from the bottom 36 of the cooker 20, flows through a conduit 8 and a valve 37, and then to a metering pump 145 controlled by variable speed motor 45. This determines the speed with which the wheat migrates through the cooker 20 in plug flow.

A level controller 105 controls the wheat level 701. The wheat level controller 105 senses the wheat level by a wheat level sensor communication line 106 connected to the wheat level sensor 110. The wheat level controller 105 sends a control signal along line 107 to the metering pump drive motor 45. This controls wheat residence time in the vertical cooker 20. Excess water removed by the sieve member 35 is recirculated through the system, the recirculated water being drawn off from the region between the sieve member 35 and the bottom member 36 by a conduit 119. A control valve 41 controls the flow of the recirculating water in the conduit 119, and is controlled by a level controller 21.

The level controller 21 controls the water level 702, which level is sensed by the water level sensor 109. A water level sensor communication line 31 communicates the water level to the level controller 21; the level controller 21 then controls the position of the valve 41 by means of a water level controller communication line 34. A conduit 121 conveys the recirculating water to a separator 200.

Due to the presence in the preferred embodiment of recirculating water in a flow volume and mass flow rate greater than that of the wheat, in turn due to the presence of the sieve member 35, water flows downward vertically through the cooker 20 at a speed different from, and usually greater than, that of the grain. This results in greater convection heat transfer into the grain of heat from the water, so as to cook the grain completely to the interior of each grain particle.

The grain and water mixture is associated in approximately equal portions and flow through the conduit 8 to the metering pump 145. From there, the metered mixture is carried by conduit 10 to a separator 80. The separator 80 is driven by a motive means 144, which may be pneumatic air or electrical power or rotary mechanical power, for example. Any conventional separator can be used, such as a centrifugal separator, vertical rotary separator, or the like. In the preferred embodiment, a vertical rotary-type separator is used to separate the water from the grain. During the cooking process, the grain absorbs water, and therefore a continuous heavier weight of cooked grain is produced than the continuous original entering weight of the raw uncooked grain entering the system. The cooked grain leaves the separator at outlet 4 and is conveyed or moved to be further processed as indicated at 85.

The water separated from the cooked wheat exits the separator 80 along conduit 120, where conduit 120 joins with conduit 121 into an inlet conduit 122 to a fine solids separator 200. The separator 200 has a fine solids exit 201 and a water outlet 202, where the water has been sufficiently separated from wheat particles so as to be suitable for recycling in the system.

A standpipe 9, having an oversized conduit portion 301 to receive the water from outlet 202, is provided. The water from the standpipe 9 communicates along conduit 306 with the inlet of a pump 43. Overflow and excess water from the oversized conduit portion 301 passes in the preferred embodiment to a drain or sewage conduit 112 along overflow conduit 303 which permits overflow water to fall into an oversized conduit 302, which oversized conduit 302 communicates with the drain or sewage 112. This also prevents overflowing of the conduit portion 301, since overflow water will be drained off over conduit 303.

The fine solids collected from the separator 200 exit through conduit 201 and fall as indicated at 307 either alone or within a conduit, to a sludge receptacle as indicated at 111 as a car for hauling sludge which operates on wheels. These fine solids can be disposed of either as animal feed or as waste material which is unusable, or can be used in any other manner desired.

The recirculating pump has a conduit 115 having a control valve 305 therein. The control valve 305 is controlled by a manual or automatic controller 304. This allows manual or automatic setting of the amount of recirculating water used in the system. The conduit 115 then enters mixer 101, previously described. This completes the recirculating portion of the cycle.

As noted, the water level 702 in the preferred embodiment is maintained by a level controller 21 which controls valve 41 by way of the valve control communication line 34. The water level sensor communication line 31 communicates with the level controller to transmit the level sensed by level sensor 109.

The control valves may be any type of control valve, including electrically operated, electro-mechanical, electronic, pneumatically-actuated, or the like. Also, the level sensing devices may be acoustic, gamma ray, electro-mechanical, optical, or may include any other type of level sensing device.

An example of the operation of the system for a particular level of supply of grain is given hereunder.

Wheat is supplied from the wheat use bin 62 to the feeder, preferably a feeder 63 which in the present example feeds the grain on a continuous basis evenly into the mixer 101 at a nominal approximate rate of 4,336 lb/hr. The initial wheat conditions in this example are 13% moisture content at 50° F. Therefore, approximately 9 GPM of water enters with the wheat. The wheat path into the mixer 101 is indicated by conduit 114.

Recirculating water in the present example enters the mixer 101 along conduit 115, at a rate of 169 GPM at a temperature of approximately 205° F. Also, new supply water is added from the water supply 50 through conduit 113 into the mixer 101 at a rate of 9 GPM in the present example at a temperature of 114° F., which has been preheated to the stated temperature.

It will be understood that none of the temperatures, pressures, and flow rates stated in the present example limit the possible temperature ranges, pressures, and flow rates in any way. The present example illustrates merely one set of operating conditions possible with the present invention. Any temperature, pressure, or flow rates can be used as appropriate to the process being used in the present apparatus.

The mixer 101 mixes the grains without crushing them, together with the recirculating water and new supply water. The mixture then flows through conduit 116 to the heater 250; at this point, a flow rate of 185 GPM water, at a temperature of 200° F., passes through the conduit 116.

The heater 250 receives the flow in conduit 116 as well as steam at a pressure of 25 PSIG and at a rate of 1,240 lb/hr from the steam supply 70. Any steam pressure or flow rate can be used; the present valves indicated are for illustration only of operation in one example of the use of the present invention. The steam travels through conduit 117, and the flow rate is controlled by a controller valve 42 which is controlled by the temperature controller 22.

The heated slurry exits from the heater along conduit 118, at a rate of 187 GPM, at a temperature of 210° F. of water, which has been heated by the steam supplied to the heater.

The heated slurry enters the top of the cooker 46, with the grain settling to the grain level 701 and the water settling to the water level 702. This results in even distribution of the grain across the level 701.

The grain descends in plug flow controlled by the metering pump 145. The upper conical baffle 502, together with the lower conical baffle 501, ensures plug flow.

Water flows through the sieve member 35 and is drawn off along conduit 119 at a rate of 161 GPM at a temperature of 209° F. and having 1.5% solids. The wheat mixture exits through conduit 8 at a rate of 7,000 lb/hr of wheat and including water at a rate of 26 GPM.

It will be understood that none of the temperatures, pressures, and flow rates stated in the present example limit the possible temperature ranges, pressures, and flow rates in any way. The present example illustrates merely one set of operating conditions possible with the present invention. Any temperature, pressure or flow rates can be used as appropriate to the process being used in the present apparatus.

This flow enters conduit 10 where a separator 80 separates the wheat from the water, the wheat going into conduit 4 at a rate of 7,000 lb/hr of wheat having 47% moisture content, at a temperature of 200° F. The water separated from the wheat exits the separator 80 along conduit 120 at a rate of 14 GPM, having a temperature of 200° F. and a solids content of 1.5%. These flows combine in conduit 122 for a combined flow rate of water of 175 GPM entering the separator 200, where the fine solids are to be removed.

The separator 200 removes approximately 300 lb/hr of sludge, at 205° F., moisture content of 92.5%, through outlet 201. This sludge enters the sludge cart 111 for disposal. The separated water flows through conduit 202 at a rate of 175 GPM at a temperature of 205° F. into the conduit 9. The conduit 303 carries approximately 6 GPM to the drain 302. This water then flows to a sewage conduit 112 (or to further wastewater processing).

The recirculating water pump 43, then returns the water to the mixer 101 along conduit 115 at a water flow rate of 169 GPM.

Figure 3:
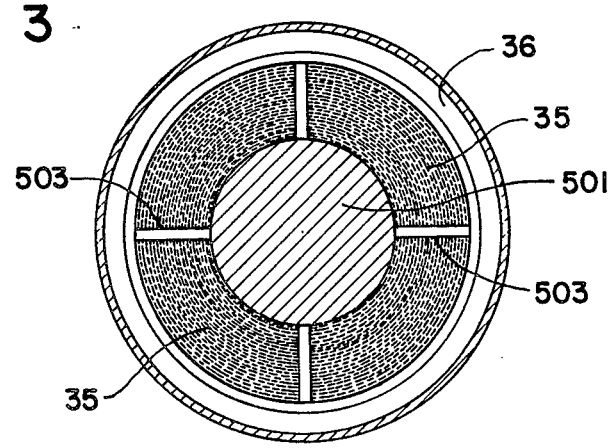
FIG. 3 is a sectional view taken along line 3—3 of FIG. 2, showing struts connecting the sieve member to the conical baffle, with areas of the sieve member being visible about the baffle portion shown.

FIG. 3 is a view taken along line 3—3 of FIG. 2 showing the general arrangement of the parts in a top view which is partially in section. Here, the circular outline of the lower baffle member 501 is shown connected to the screen 35 by a plurality of struts 503. The textured nature of the screen 35 is generally indicated in FIG. 3 where the circular sectional portion in hatching of the screen 35 is shown with the remaining portion of the screen 35 visible. Also, the circular cross sectional outline of the bottom 36 is shown in FIG. 3 as well.

Recycling the cooking water, heating, and mixing it externally results in a very even internal cooker temperature as well as even and flow distribution in the cooker and greater unifomity. If this mixing and heating were done in the cooker 20, flow disruption of the plug flow of wheat would occur, as would temperature non-uniformities in the grain occur. Such plug flow disruption would be undesirable and would result in overcooking of some particles, and undercooking of other particles of grain. Therefore, the recycling and mixing steps taking place outside of the cooker 20 provide an important improvement over the prior art. Conventional steam heating, i.e. the providing of heat by heating of the outer jacket of the cooker 20, would result in an uneven heat distribution of grain within the cooker 20, also resulting in uneven cooking.

Also, the present cooker has no internal moving parts, and therefore is more reliable while at the same time maintaining even cooking conditions and plug flow conditions of grain flow, which is critical to the success of this invention.

Each grain particle receives uniform treatment with regard to heating as well as cooking water penetration. There is less mechanical maintenance required than in the prior art devices, and is a sanitary design allowing for clean-in-place cleaning.

The step of removing water at the sieve 35 for recycling is essential, because the grain must be raised from a temperature of approximately 50° F. (or ambient temperature) to approximately 210° F. The grain must be held within the cooker 20 for a sufficient time to cook it fully. This time period will vary depending upon the type of grain used, and water temperature, such cooking times being generally known in the prior art.

Because external heating is used, heat is continuously added to the recycling water and grain mixture, and therefore the water is the only medium used because even heating results therefrom. Steam injection directly into the cooker would destroy the uniform plug flow of grain through the cooker.

As another example of the use of the present invention apparatus and process, a hypothetical set of values of water flow velocity and wheat flow velocity is calculated hereunder. This demonstrates how convection heat transfer can be controlled or increased in the vertical cooker 20 by control of the relative recirculating water flow rate to the wheat-and-water mixture flow rate in conduit 8. Assuring the flow rates in the preceding example, for an inner diameter of three feet of the vertical cooker 20, the water velocity can be calculated from the equation $Q = VA$, where $Q$ = volume flow rate (which is calculated as mass flow rate divided by the material density); V=velocity (the variable to be determined); and A=effective cross-sectional area through which the material flows. It is assumed that the absolute density of water in the cooker is 62.27 lb/cubic foot; the absolute density of raw wheat is 81.0 lb/cubic foot; and the absolute density of cooked wheat is 75.9 lb/cubic foot.

At the top of the cooker 20, between levels 701 and 702, the minimum water velocity is found by assuming that there is no falling raw grain (if there were, the effective area for the water flow would be reduced and the water velocity, by the equation, would be increased.) For the water flow rate of 187 GPM; and a cross-sectional area of 7.07 square feet; the minimum water velocity between level 702 and 701 is at least 213 ft./hr.

A water and raw grain mixture flows just below level 701, assuming for this example each effective area A (through which each material flows) is one-half the total available area, the velocities are as follows. The water velocity just below level 701 would be approximately 426 ft./hr.; the raw wheat velocity just below level 701 would be 23 ft./hr. Therefore, the velocity difference for heat transfer purposes is 403 ft./hr. in this hypothetical example.

Similarly, for the relative velocities of water and cooked wheat just above the top of cone 502 (in this hypothetical example) would be as follows, again assuming the effective area for flow is one-half the total cross-sectional area. The cooked wheat velocity (which cooked wheat has an increased moisture content over raw wheat) would be 43.4 ft./hr.; the minimum water velocity (disregarding increased velocity due to transverse flow about individual particles) would remain at approximately 426 ft./hr. The velocity difference for convection heat transfer is then approximately 383 ft./hr.

Other, more extreme examples could easily be calculated. For example, for a very dense particulate material, and for much greater recirculating fluid flow rates, greater convection heat transfer rates could be obtained if such is desired. Also, for the case of chemical reaction between the fluid and the particulate material, relative velocity would affect the reaction rate.

The improved continuous process apparatus and method for cooking cereal grains of the present invention is capable of achieving the above-enumerated objects and while preferred embodiments of the present invention have been disclosed, it will be understood that it is not limited thereto but may be otherwise embodied within the scope of the following claims.

What is claimed is:

1. A vertical cooker for cooking grain, comprising:
   a vessel having a top wall and a cylindrical side wall;
   an inlet adapted to receive a slurry;
   a bottom member generally conical in shape and having a means for separating liquid from particulate material;
   and a first conical baffle member adapted to prevent disruption of plug flow of said particulate material downward through said vessel;
   wherein said bottom member is connected to a lowermost edge of said side wall by a flexible joint member, and further comprising a means for vibrating said bottom to assist plug flow from said vessel,
   whereby plug flow occurs in said vessel.

2. A vertical cooker for cooking grain as claimed in claim 1, wherein said first conical baffle member is generally centrally disposed along a vertical central axis of said vessel, and is disposed adjacent to and vertically above an uppermost portion of said bottom member with the narrowest portion of the conical baffle upwards; and wherein a second conical baffle member is disposed in said bottom member, said second conical baffle member being fixedly attached to a bottom portion of said first conical baffle member; wherein said first and second conical baffle members are spaced a predetermined distance from a sieve member for separating liquid from particulate material by a means for spacing; and said sieve member is connected to said bottom member so as to be vibrated together with said bottom member by said means for vibrating.

3. A vertical cooker comprising:
   a vessel having a top wall, a cylindrical side wall, and
   a bottom member comprising a generally conically shaped portion in the shape of a truncated, inverted hollow cone attached in fluid-tight relationship with said side wall wherein said bottom member is connected to a lowermost edge of said side wall by a flexible joint member further comprising a means for vibrating said bottom member to assist plug flow of particulate material through said vessel; and
   an inlet adapted to receive a mixture of liquid and particulate material;
   wherein said bottom member has means for separating liquid from particulate material, including a sieve member; and further comprising a first baffle member attached to said bottom member and adapted to prevent non-plug flow of said particulate material downward through said vessel.

4. A vertical cooker as claimed in claim 3, wherein said sieve member is spaced a generally uniformly spaced predetermined distance from an interior wall of said bottom member.

5. A vertical cooker as claimed in claim 3, wherein said sieve member is connected to said bottom member so as to be vibrated together with said bottom member by said means for vibrating.

6. A vertical cooker as claimed in claim 3, wherein said means for vibrating comprises a motor having an offset weight operated by said motor.

7. A vertical cooker as claimed in claim 3, wherein said vertical cooker is adapted to be pressurized.

* * * * *